(12) United States Patent
Lindsay

(10) Patent No.: US 8,157,315 B2
(45) Date of Patent: Apr. 17, 2012

(54) VEHICLE SEAT ASSEMBLY

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 12/627,186

(22) Filed: Nov. 30, 2009

(65) Prior Publication Data

US 2011/0127794 A1 Jun. 2, 2011

(51) Int. Cl.
*B60N 2/02* (2006.01)
(52) U.S. Cl. .................................. 296/65.05
(58) Field of Classification Search .......... 296/65.05, 296/65.09; 297/312, 313, 316, 324, 329, 297/331, 340, 452.16
See application file for complete search history.

(56) References Cited

U.S. PATENT DOCUMENTS

| 7,762,604 | B1 * | 7/2010 | Lindsay | 296/64 |
| 2003/0085602 | A1 * | 5/2003 | Ogino et al. | 297/331 |
| 2005/0269830 | A1 * | 12/2005 | Epaud | 296/65.09 |

* cited by examiner

*Primary Examiner* — H Gutman
(74) *Attorney, Agent, or Firm* — Rankin Hill & Clark LLP

(57) ABSTRACT

A vehicle seat assembly includes a seat base having a forward portion and a rearward portion, wherein the rearward portion is tiltable about the forward portion. A seatback is connected to the rearward portion of the seat base. The seat back tilts with the rearward portion when the rearward portion is tilted relative to the forward portion to provide ingress/egress access behind the seat back and the seat base.

20 Claims, 3 Drawing Sheets

VEHICLE SEAT ASSEMBLY

BACKGROUND

The present disclosure generally relates to a vehicle seat assembly, and more particularly relates to a mid-cushion pivot arrangement for a vehicle seat.

Vehicles having two or three rows of seating are known to include sliding seats positioned behind a first row of seats. The sliding seats can be moved toward a forward position to provide access to a rearward portion of the vehicle cab located behind the sliding row of seats. For example, vehicles having three rows of seating are known to provide increased passenger ingress and egress space to and from a third row of seating by sliding the second row of seating into the forward position. Vehicles having two rows of seating are also known to provide ingress and egress space to and from a cargo area located behind the second row of seating by sliding the second row of seating into a forward position.

In addition to sliding, or instead of sliding, some vehicle seats are tiltable to provide access to a third row of seats and/or a cargo area disposed behind the tiltable seat. One known tiltable arrangement includes a seat cushion pivotable about its forward end. In this arrangement, when the vehicle seat is pivoted about the forward end of the seat cushion, the seat back connected to the cushion pivots together with the seat cushion as a single unit. Unfortunately, this arrangement requires the user to lift the entire weight of the seat cushion and seat back while pivoting the seat. In addition, a large trajectory is created as a result of the entire seat being pivoted. Further, in some tilting seat arrangements, a latching arrangement is provided wherein a rear end of the seat cushion latches on an associated striker positioned on the vehicle floor (or vice versa). This can create a pinch hazard, which is exacerbated due to the seat back and the entire seat cushion contributing to the weight applying downward pressure.

SUMMARY

An example of a vehicle seat assembly that can provide ingress/egress access behind the seat assembly can include a seat back having a forward portion and a rearward portion. The rearward portion is tiltable about the forward portion. A seat back is connected to the rearward portion of the seat base. The seat back tilts with the rearward portion when the rearward portion is tilted relative to the forward portion to provide ingress/egress access behind the seat back and the seat base.

Another example of a seat assembly for a vehicle that can overcome the aforementioned shortcomings includes a seat back having a stationary cushion portion and a tiltable cushion portion. A seat back is connected to the seat base. The seat back and the tiltable cushion portion are pivotable as a unit about a generally laterally-extending horizontal axis disposed between the stationary cushion portion and the tiltable cushion portion.

In a further example, a mid-cushion pivot arrangement for a vehicle seat includes a forward seat base portion, a rearward seat base portion and a mid-cushion pivot pivotally securing the rearward seat base portion to an associated vehicle floor. The rearward seat base portion is pivotable about the pivot and thereby tiltable over the forward seat base portion for providing access behind the rearward seat base portion.

DETAILED DESCRIPTION

Figure 1:
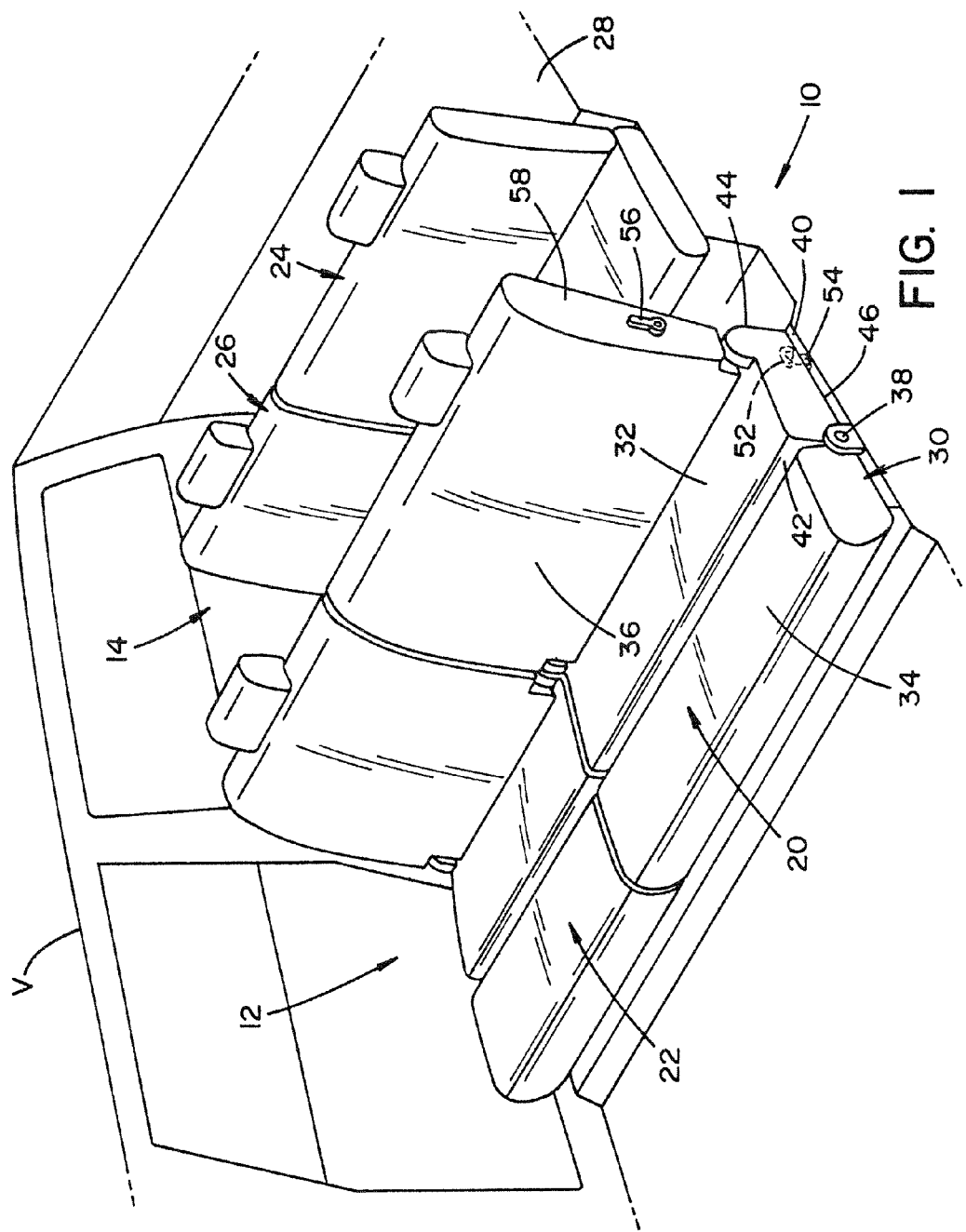
FIG. 1 depicts a perspective view of a seating arrangement for a vehicle, particularly second and third row seats in a vehicle.
Figure 2:
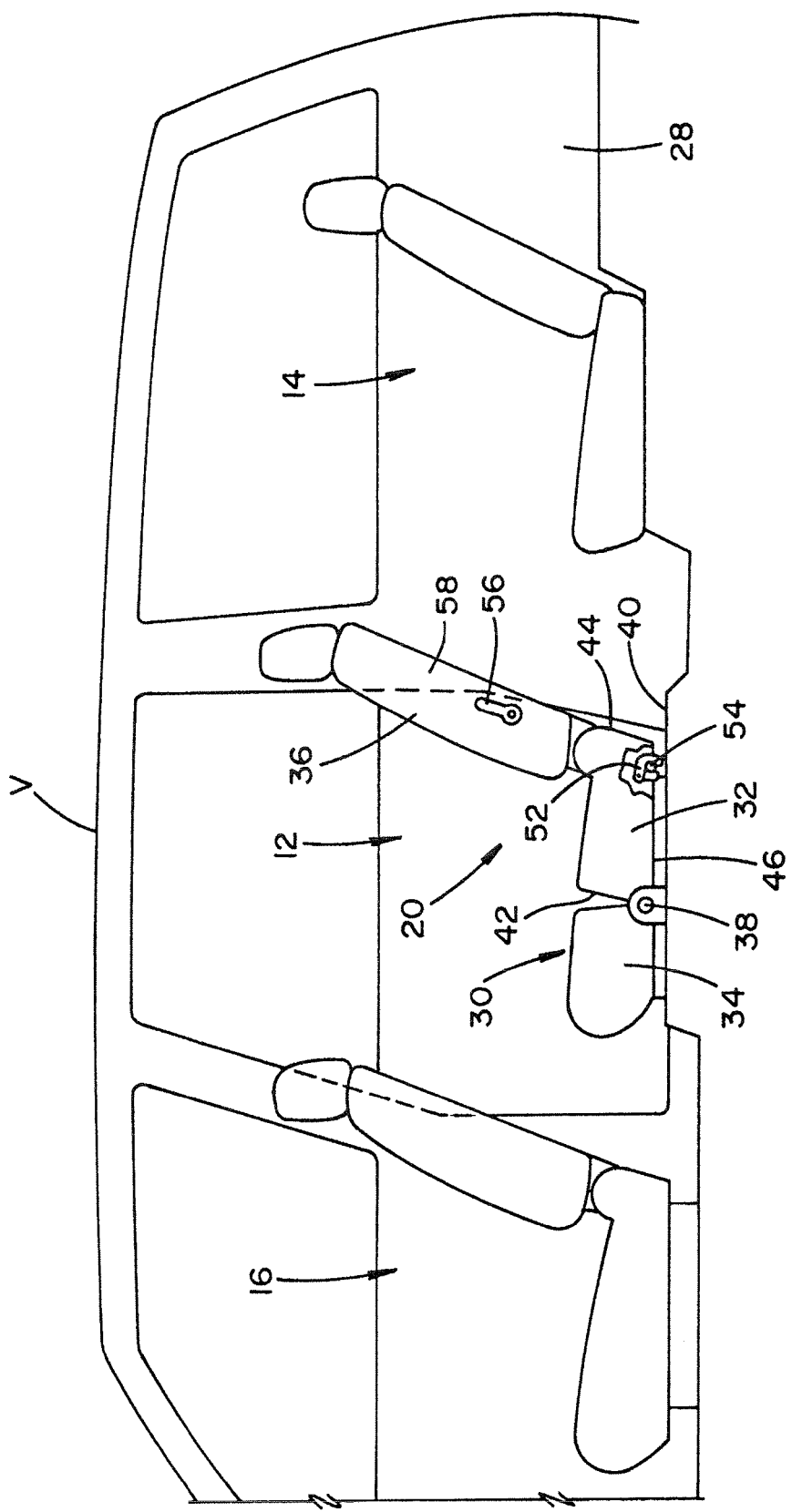
FIG. 2 is a schematic elevation view of the seating arrangement including the second and third row seats of FIG. 1 and also showing a first row of vehicle seats.

Referring now to the drawings, wherein the showings are for purposes of illustrating one or more of exemplary embodiments and not for purposes of limiting same, FIG. 1 shows a vehicle seating arrangement 10 including a forward row of seats 12 and a rearward row of seats 14 disposed behind the forward row of seats with respect to a longitudinal length of the vehicle. In one embodiment, the forward row of seats 12 can be the second or middle row of seats in the vehicle V and the rearward row of seats 14 can be a third row of seats in the vehicle V. With additional reference to FIGS. 2 and 3, a front row of seats 16 can be forwardly disposed relative to the middle row of seats 12.

In the illustrated embodiment, the middle and rear rows of seats 12, 14 are shown as split-row seats, particularly 60-40 split seats in the illustrated embodiment, though this is not required. In the split arrangement, the row of seats 12 can include a first vehicle seat assembly 20 laterally adjacent a second vehicle seat assembly 22. As shown, the first vehicle seat assembly 20 can comprise the "60" portion of the split row of seats 12 and the second vehicle seat assembly 22 can comprise the "40" portion of the row of seats 12. While the vehicle seat assemblies 20 and 22 are disposed laterally adjacent one another, each one can be independently operable. In particular, as will be described in more detail below, each includes a seat back that has a recline angle that is adjustable relative to a seat base portion. Moreover, each seat base portion includes a mid-cushion pivot arrangement allowing one part of the seat base in combination with the seat back to be tilted over the other part of the seat base.

The rearward row of seats 14 can also be arranged to incorporate split row seating. In particular, the row of seats 14 can include a first vehicle seat assembly 24 comprising the "60" portion of the split row of seats 14 and a second vehicle seat assembly 26 comprising the "40" portion of the split row of seats 14. The vehicle seat assemblies 24, 26 of the rearward row of seats 14 can also include respective seat back portions and seat base portions. As known and understood by those skilled in the art, the seat back portions of the seat assemblies 24, 26 can be foldable over the seat base portions to increase a rear cargo area 28 of the vehicle V. In particular, with the seat back portions folded over the seat base portions in the seat assemblies 24, 26, the rear cargo area 28 can have an increased floor area for carrying cargo.

By this arrangement, the vehicle seat assembly 20 of the middle row 12 is forwardly positioned relative to the vehicle seat assembly 24 of the rearward row 14. Likewise, the vehicle seat assembly 22 is forwardly positioned relative to the vehicle seat assembly 26. Thus, the vehicle seat assemblies 24, 26 form respective second seat assemblies having respective second seat bases with second seat backs connected thereto. These second seat assembles 24, 26 are positioned rearwardly relative to the seat assemblies 20, 22 and thus rearwardly relative to the seat backs and tiltable cushion portions of the seat assemblies 20, 22.

Aside from a lateral dimension, the first and second vehicle seat assemblies 20, 22 of the middle row of seats 12 can be the same or similar to one another. Accordingly, further description of the vehicle seat assembly 20 will be provided herein with fewer details being provided on the vehicle seat assembly 22; however, it is to be appreciated that the discussion of the first vehicle seat assembly 20 is applicable to the second vehicle seat assembly 22 unless otherwise indicated herein.

In the illustrated embodiment, the vehicle seat assembly 20 includes a seat base 30 having a rearward portion 32 and a forward portion 34. The forward portion 34 of the seat base 30, which can also be referred to as a stationary cushion portion, is fixedly and nonmovably mounted within the vehicle V. In contrast, as will be described in more detail below, the rearward portion, which can be referred to as a tiltable cushion portion, is tiltable about the forward portion 34 for providing ingress/egress access behind the seat assembly 20 (e.g., to the third row of seats 14). The forward portion 34, in the illustrated embodiment, has a longitudinal length that is shorter than the rearward portion 32, though this is not required. Particularly in the illustrated embodiment, the longitudinal length of the forward portion 34 is approximately one-half a longitudinal length of the rearward portion 34, though again this is not required.

The vehicle seat assembly 20 additionally includes a seat back 36 connected to the seat base 30 and particularly connected to the rearward portion 32 of the seat base 30. As will be described in more detail below, the seat back 36 can tilt with the rearward portion 32 when the rearward portion 32 is tilted relative to the forward portion 34 to further provide ingress/egress access behind the seat back 36 and the seat base 30 (i.e., to the third row of seats 14). More particularly, the seat back 36 and the rearward portion 32 of the seat base 30 are pivotable as a unit about a generally laterally-extending horizontal axis disposed between the rearward portion 32 and the forward portion 34 of the seat base 30.

More specifically, the vehicle seat assembly 12 includes a mid-cushion pivot arrangement wherein a mid-cushion pivot 38 pivotally secures the rearward portion 32 to a vehicle floor 40 and defines the generally laterally-extending horizontal axis about which the rearward portion 32 is pivotable. In particular, a forward end 42 of the rearward portion is connected to the pivot 38. Accordingly, the rearward portion 32 with the seat back 36 attached thereto is pivotable about the pivot 38 and thereby tiltable over the forward portion 34 for providing access behind the rearward portion 32 and the seat back 36 connected thereto.

Figure 3:
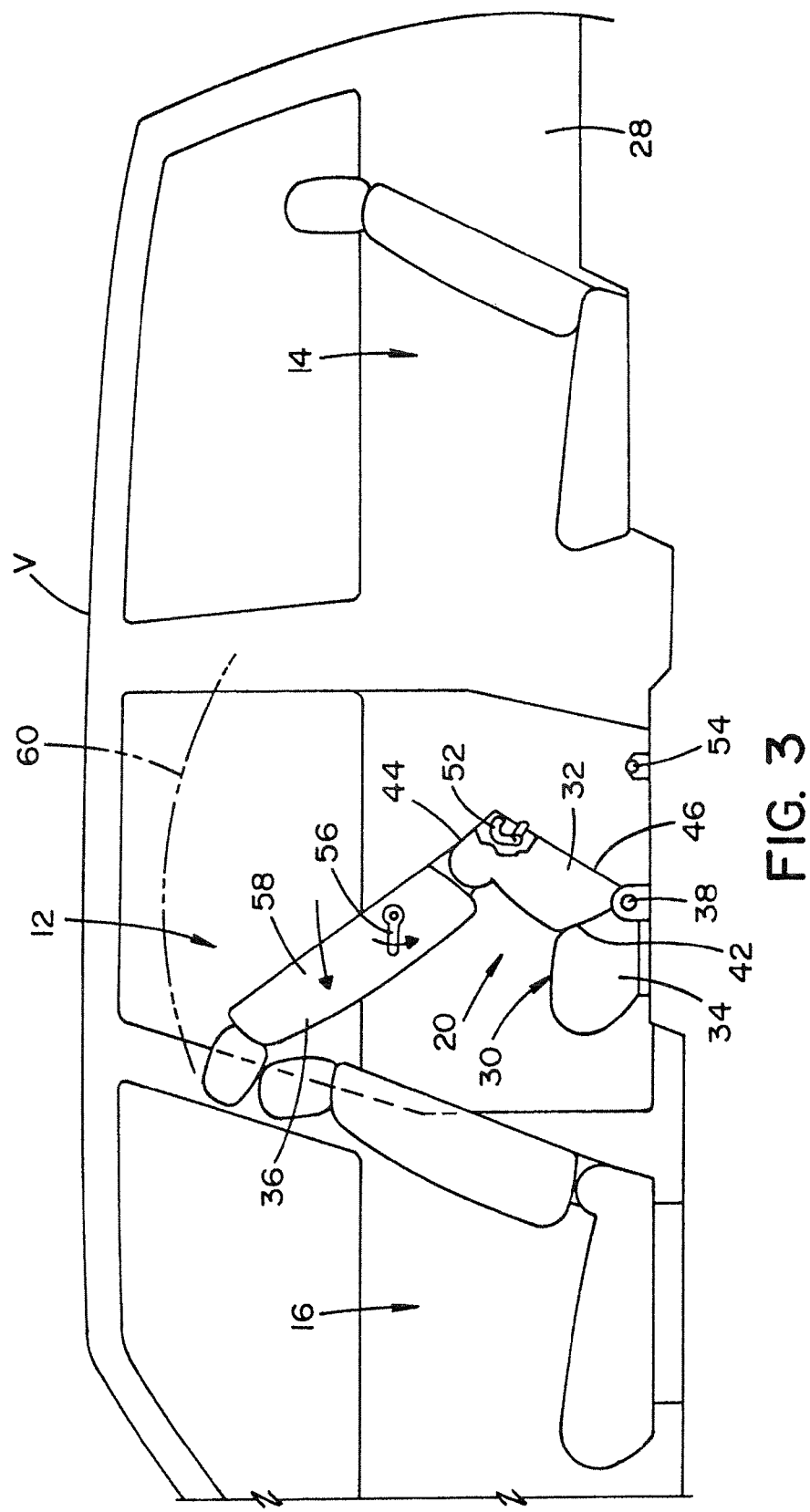
FIG. 3 is a schematic elevational view of a seating arrangement similar to FIG. 2, but showing one of the second row seats being tilted about a mid-cushion pivot to provide ingress/egress to the third row seats.

By this arrangement, as best shown in FIG. 3, the rearward portion 32 of the seat base 30 is tiltable along a forward end 42 thereof. Since the seat back 36 is attached to the rearward portion 32, particularly adjacent a rearward end 44 thereof, the rearward portion 32 is tiltable with the seat back 36 over the forward portion 34 as shown. In the illustrated embodiment, the axis defined by the pivot 38 is specifically disposed adjacent an underside 46 of the seat base 30, though this is not required. For example, the pivot 38 could be located toward an upper side of the seat base 30 in an alternative embodiment.

Continuing with the illustrated embodiment, the rearward portion 32 can be selectively latched to an adjacent vehicle body component. In particular, in the illustrated embodiment, the rearward end 44 of the rearward portion 32 is selectively latched to a body structure member of the vehicle V in which the seat base 30 is mounted. As shown, the body structure member can be the vehicle floor 40. In the illustrated embodiment, the rearward portion 32 includes a latch mechanism 52 disposed adjacent to the rear side 44 of the seat base 30 that selectively latches onto a striker 54 mounted to the adjacent vehicle component (e.g., the vehicle floor 40). Accordingly, in the illustrated arrangement, the rearward end 44 of the rearward portion 32 carries the latching mechanism 52 for selectively locking onto the striker 54 which is mounted onto the vehicle floor 40. Though not illustrated, it is to be appreciated that this arrangement can be reversed. That is, the latching mechanism 52 could be provided on the associated vehicle component, such as the vehicle floor 40, and the striker 54 could be mounted on the rearward portion 32 of the seat base 30.

As shown, the seat back 36 of the illustrated embodiment includes an actuator lever 56 for selectively releasing the latch mechanism 52 from the striker 54. In particular, the seat back 36 can have the actuator lever 56 mounted on a lateral side 58 thereof. Though not shown, the actuator lever 56 can be operatively connected to the latching mechanism 52 for releasing the latching mechanism 54 from locked engagement with the striker 54. Once released, the rearward portion 32 and the seat back 36 can be pivoted about the forward portion 34 as shown in FIG. 3. This provides improved ingress/egress to the area behind the vehicle seat assembly 20, for example to the third row of seats 14.

Advantageously, the disclosed arrangement does not require the entire weight of the seat base 30 to be lifted when tilting the vehicle seat assembly 20. In addition, as indicated by the phantom line 60 in FIG. 3, the trajectory of the tilting seat back 36 is generally smaller because the entire seat is not swinging, such as about a forward edge of the forward portion 34. An additional advantage is that less weight is required to be lifted, which can sometimes eliminate the need for a preloaded spring system for assisting in tilting of the vehicle seat. Further, less weight going up also reduces the amount of weight that potentially could come down on a rear occupant's foot should a rear occupant leave his or her foot in an area at which the rearward portion 32 contacts the vehicle V, such as where the latch mechanism 52 engages the striker 54.

While the rearward portion 32 and the seat back 36 attached thereto have been disclosed as being pivotable about the pivot 38 for improved ingress/egress to the third row of seats 14, it is also to be appreciated that the seat back 36 can be angularly adjustable relative to the seat base 30, and particularly the rearward tilting portion 32 of the seat base 30 for adjusting a recline angle of the seat back 36. In one embodiment, the latch mechanism 52 could be rotated a first amount for adjusting a recline level of the seat back 36 relative to the seat base 30 and a second, greater amount to unlatch the latching mechanism 52 from the striker 54 when tilting of the vehicle seat assembly 20 is desired.

Though not shown in the illustrated embodiment, it is contemplated that the mid-cushion pivot arrangement disclosed herein could be applied to a vehicle seat in addition to a slide rail arrangement for the vehicle seat. In combination with a slide rail arrangement, the mid-cushion pivot arrangement could provide additional ingress and egress clearance behind the seat employing the mid-cushion pivot arrangement.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat assembly, comprising:
    a seat base having a stationary forward portion defining a forward seating surface of the seat base and a rearward portion defining a rearward seating surface of the seat base, said rearward portion tiltable about the forward portion via a pivot location located between the forward and rearward portions; and a seat back connected to said rearward portion of said seat base, said seat back tilting with said rearward portion when said rearward portion is tilted relative to said forward portion to provide ingress and egress access behind said seat back and said seat base.

2. The vehicle seat assembly of claim 1 wherein said rearward portion of said seat base is tiltable along a forward end thereof.

3. The vehicle seat assembly of claim 1 wherein said seat back is attached to said rearward portion adjacent a rearward end of said rearward portion.

4. The vehicle seat assembly of claim 1 wherein a rearward end of said rearward portion is selectively latched to a body structure member of a vehicle in which said seat base is mounted.

5. The vehicle seat assembly of claim 4 wherein said body structure member is a vehicle floor having a striker mounted thereto, said rearward end carries a latching mechanism for selectively locking onto said striker.

6. The vehicle seat assembly of claim 5 wherein said seat back has an actuator lever mounted on a side thereof, said actuator lever operatively connected to said latching mechanism for releasing said latching mechanism from locked engagement with said striker.

7. The vehicle seat assembly of claim 1 wherein said forward portion of said seat base is fixedly and nonmovably mounted.

8. The vehicle seat assembly of claim 1 wherein said forward portion has a longitudinal length that is shorter than that of said rearward portion.

9. The vehicle seat assembly of claim 8 wherein said longitudinal length of said forward portion is approximately one half a longitudinal length of said rearward portion.

10. A seat assembly for a vehicle, comprising:
a seat base having a stationary cushion portion and a tiltable cushion portion, an upper surface of each of the stationary cushion portion and tiltable cushion portion forming a seating surface of the seat base for accommodating a seated passenger; and a seat back connected to said seat base, said seat back and said tiltable cushion portion pivotable as a unit about a generally laterally extending horizontal axis disposed longitudinally relative to the vehicle between said stationary cushion portion and said tiltable cushion portion.

11. The seat assembly of claim 10 wherein said stationary cushion portion is a forward portion of said seat base and said tiltable cushion portion is a rearward portion of said seat base, said tiltable cushion portion tiltable with said seat back over said stationary cushion portion.

12. The seat assembly of claim 11 wherein said axis is disposed adjacent an underside of said seat base.

13. The seat assembly of claim 10 further including:
a second seat base having a second seat back connected thereto, said second seat base and said second seat back positioned rearwardly relative to said seat back connected to said tiltable cushion portion, ingress and egress to said second seat base and said second seat back provided by tilting said tiltable cushion portion over said stationary seat cushion.

14. The seat assembly of claim 10 wherein said tiltable seat portion is selectively latched to an adjacent vehicle body component.

15. The seat assembly of claim 14 wherein said tiltable seat portion includes a latch mechanism disposed adjacent a rear side thereof that selectively latches onto a striker mounted to said adjacent vehicle body component.

16. The seat assembly of claim 15 wherein said seat back includes an actuator lever for selectively releasing said latch mechanism from said striker.

17. The seat assembly of claim 10 wherein said seat back is angularly adjustable relative to said tiltable seat portion for adjusting a recline angle.

18. A vehicle seat assembly comprising:
a seat base having a stationary forward portion defining a forward seating surface of the seat base and a rearward portion defining a rearward seating surface of the seat base, said rearward portion tiltable about the forward portion via a pivot location located between the forward and rearward portions;

a seat back connected to said rearward portion of said seat base, said seat back tilting with said rearward portion when said rearward portion is tilted relative to said forward portion to provide ingress and egress access behind said seat back and said seat base; and a mid-cushion pivot pivotally securing said rearward portion to an associated vehicle floor, said rearward portion pivotable about said pivot and thereby tiltable over said forward portion for providing access behind said rearward portion.

19. The vehicle seat assembly of claim 18 wherein said seat back is connected to said rearward portion adjacent a rearward end thereof, a forward end of said rearward portion connected to said pivot.

20. The vehicle seat assembly of claim 19 wherein said seat back and said rearward portion are tiltable as a unit over said forward seat base portion.

* * * * *